United States Patent

McCormick

[11] 4,235,531
[45] Nov. 25, 1980

[54] COLOR MOVIE FILM NOISE REDUCTION SYSTEM

[76] Inventor: Thomas J. McCormick, 19639 Vission Dr., Topanga, Calif. 90290

[21] Appl. No.: 9,309

[22] Filed: Feb. 5, 1979

[51] Int. Cl.³ .......................... G03B 31/02; G11B 7/00
[52] U.S. Cl. ............................... 352/27; 179/100.3 K
[58] Field of Search .......................... 352/27, 28, 5; 179/100.3 GN, 100.3 K

[56] References Cited

U.S. PATENT DOCUMENTS

| | | | |
|---|---|---|---|
| 3,407,272 | 10/1968 | Barocela | 179/100.3 K |
| 3,513,268 | 5/1970 | John, Jr. | 179/100.3 K |
| 3,903,360 | 9/1975 | Kamisaka et al. | 179/100.3 K |
| 3,969,593 | 7/1976 | Vlahos | 179/100.3 K |

*Primary Examiner*—L. T. Hix
*Assistant Examiner*—W. J. Brady
*Attorney, Agent, or Firm*—Singer & Singer

[57] ABSTRACT

Sound is recorded on color movie film using conventional techniques preferably by variations in density and printed in color such as cyan. Noise reduction on playback is achieved by utilizing a light source generating frequencies capable of being modulated by the color of the sound track and preferably high in infrared frequencies. The infrared frequencies do not see the color sound track but are responsive to noise and other impurities. The modulating signal will be affected by both the colored sound track and impurities. All light frequencies passing through the sound track are directed to a filter such as a dichroic cold mirror which passes the IR frequencies to a first detector and reflects the sound track modulated signal plus noise to a second detector. Apparatus is described for algebraically combining the output of both detectors to thereby cancel the effects of the noise signal from the desired sound track modulated signal.

5 Claims, 1 Drawing Figure

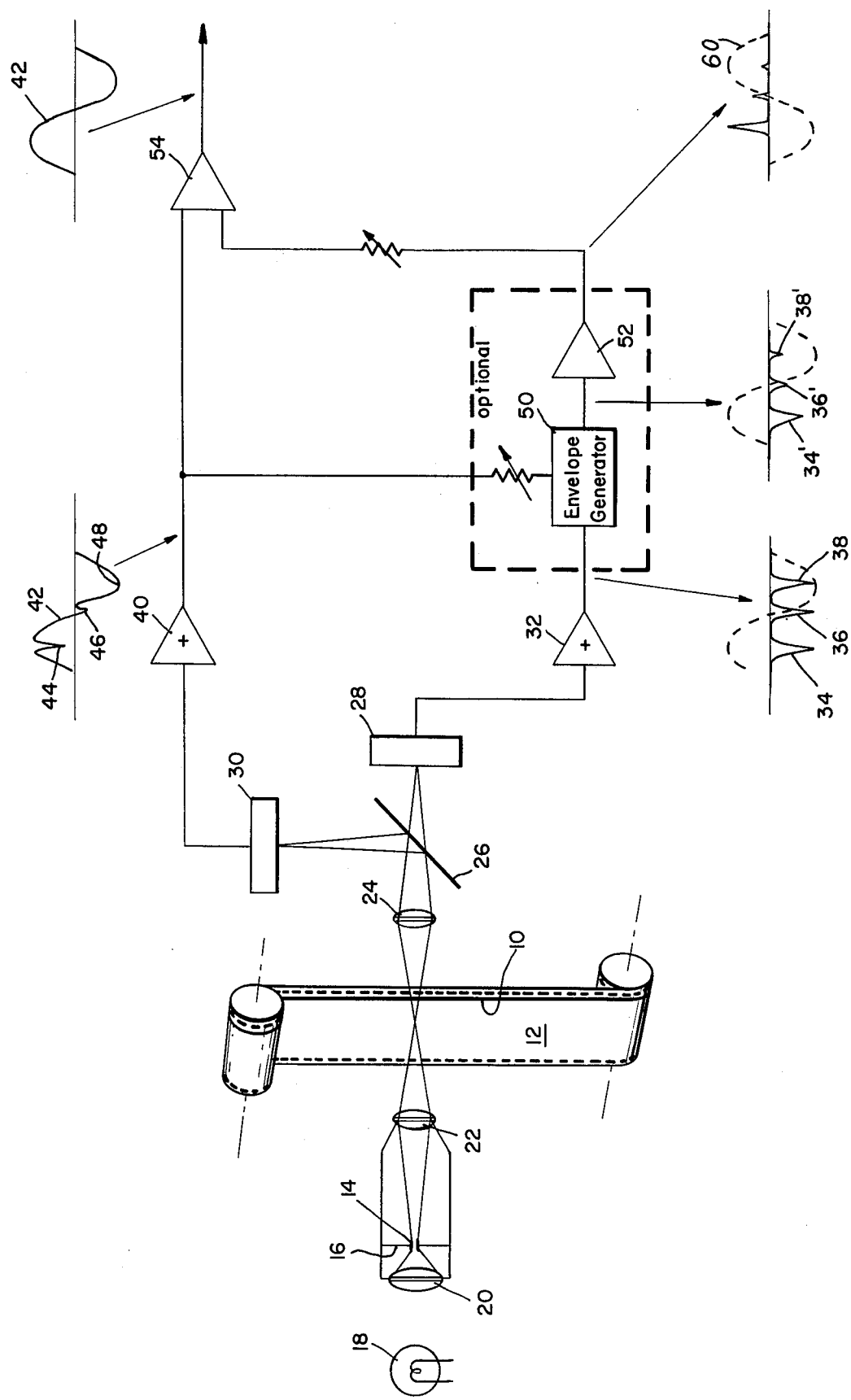

COLOR MOVIE FILM NOISE REDUCTION SYSTEM

This invention relates to a noise canceling system suitable for use with color movie film in which the sound track is printed in a preferred color. Noise signals are detected by infrared frequencies that are not affected by the colored sound track and which are used to balance out the effect of noise in the modulating signal produced as a result of the sound track.

In the art as practiced today, sound tracks are either black and white silver sound track, or redeveloped silver on color film. On color film the recorded sound track is developed in a process generally identified as the application process and which is more fully described in U.S. Pat. No. 3,758,300 issued to E. J. Walsh, Jr. Present-day sound track systems utilize the redeveloped sound track which takes the magenta and cyan dye layers and redevelops them to silver which blocks all wave lengths and in this way all light is modulated in accordance with the sound track. The silver also acts as a filter to block infrared.

In the practice of the present invention the sound track is recorded on one of the color layers and preferably on the red layer which is also called the cyan layer because it is red dense which means that the red light is being modulated by the sound track. The sound track will optically appear to be cyan in color which is the absence of red since red is being modulated by the sound track. In the preferred embodiment the record is made on the red layer.

By recording in the red layer it is not necessary to redevelop the film and the whole process of redeveloping with the additional application of silver on the sound track is eliminated.

On playback a light source rich in the wave lengths being modulated which in the preferred embodiment are red and also rich in the infrared are focused upon the cyan sound track to be modulated. The infrared signals will pass through the film and not see the color sound track, however, noise information in the form of dirt, grease and other impurities deposited on the film will be detected by the infrared signals.

The red wave lengths will be modulated by the cyan sound track together with any noise also appearing on the film. In other words, the red signals will contain a noise plus signal modulation while the infrared wave lengths will contain only noise information.

The light is focused on a split mirror such as a dichroic mirror which allows the infrared signals to pass through and are focused on a suitable detector. The desired signal containing the desired modulation and noise information modulating the red signal will be reflected and focused upon a second detector.

The output of both detectors are algebraically combined by having the noise signals detected from the infrared signals canceling out noise modulation contained on the desired sound track modulated signal. Since the dichroic filter does not create a phase shift, the time sequence between the noise picked up by the infrared signal and the noise modulated on the desired sound track signal will be the same and the signals may be algebraically combined in suitable proportions to remove the effect of the noise, thereby allowing the desired signal to pass through and in this way improve the signal to noise ratio of the overall system.

A test of the described system utilizing a cyan sound track on a variable density recording with a tungsten playback light rich in red and infrared frequencies resulted in a signal to noise ratio improvement of a little over 15 db.

The described system is compatible with present-day techniques by the inclusion of an IR filter which will have the same effect as the present-day silver backing used on sound track film.

A review of the prior art discloses that U.S. Pat. No. 4,044,207 issued to Petro Vlahos disclosed a system for recording in color as a means of eliminating the problem of film weave which he defines as movement of the film in a lateral direction as the film passes through sound producing apparatus. Vlahos actually records in two different colors in what appears to be a push-pull arrangement that modulates the two outer tracks of both colors to represent a common sound channel and then to electrically sum the output signals to thereby reduce the effect of film wave at either edge by means of his push-pull technique. Vlahos is not concerned with eliminating noise by producing a noisy signal through the use of infrared in combination with a color recorded channel but rather to utilize two color channels in push-pull for completely different purposes.

In the present invention the inventive concept is the detection of noise by utilizing infrared signals that pass through the film and do not see the sound track but only see the noise that is present on the sound track in the form of dirt, scratches, oil and the like. It is imperative that the sound track be printed in a color medium in order for the infrared to pass through and not see the sound track.

The light modulating signal will be affected by both the colored sound track and the noise, thereby producing a signal affected by noise and the sound track, which signal is phase coherent with the noise signal. Both signals are algebraically combined so as to remove the effect of the noise and in this way produce a substantially clean desired signal.

Further objects and advantages of the present invention will be made more apparent by referring now to the accompanying drawing wherein FIG. 1 illustrates a block diagram showing the basic essential elements needed to practice the noise elimination qualities of the present invention.

In order to best understand the invention, it must be remembered that one of the biggest problems affecting the enjoyment of movie film is the accumulation of dirt, grease, oil, scratches, and other impurities on the film sound track.

On playback, the modulating light is focused upon the sound track and is modulated not only by the desired sound track but also by all the impurities that are amplified and fed through the system to be reproduced and heard by the listener as noise signals and other objectionable sounds produced by the impurities.

The obvious solution is to prepare clean prints and to keep the movie film as error free as possible by constant attention to details of cleanliness and careful handling of the finished film. Unfortunately the mass production and movement of film through industry requires that each print be played the largest number of times in order to maximize the rate of return to the owner of the film, which unfortunately means utilizing the film after it has accumulated the objectionable scratches and marks mentioned above. The cost of producing a print mandates the maximum use of the print before the print is destroyed or otherwise replaced.

The economics of the situation demands therefore that the maximum possible number of playbacks be obtained from every print regardless of its condition. This invention is an attempt to improve the signal to noise ratio of the sound quality of a given film sound track by eliminating noise signals impressed upon the desired sound track by the objectionable effects of atmosphere, dirt, normal aging and improper handling.

The concept behind the present invention is to detect the noise produced by the objectionable indicia on the film and to generate a signal indicative of the noise signals, which noise signal may then be combined in the proper phase relationship with the desired sound track signal which also contains noise modulated signals impressed upon it so as to thereby eliminate the noise effect by algebraically combining the two signals.

While the invention is described in terms of utilizing red dense or a cyan sound track, it is possible to utilize any color compatible with the light source and detectors used that will provide the necessary output signal in that color range.

In the practice of the present invention it is found most desirable to utilize a cyan sound track and to modulate the red signal because of the suitability of silicon detectors that are efficient in the red wave length band.

Referring now to FIG. 1, there is shown in schematic form a system for optically scanning a moving sound track variable density sound record 10 carried by the movable film 12. The slit aperture 14 in diaphram 16 is uniformly illuminated by the light source 18 and lens 20 and is imaged by the lens 22 on the sound record 10.

The light focused by lens 22 is modulated by the variable density sound track 10 and focused by lens 24 onto a dichroic mirror 26 that has the property of passing the infrared signal from the light source 18 directly to a first detector 28 and reflecting the red modulated light signals to a second detector 30.

The output signals from the first detector 28 and the second detector 30 will maintain the same phase relationship without distortion since the dichroic mirror 26 does not cause the delay in the transmission at the wave lengths involved.

The output of the IR detector 28 is fed to a suitable amplifier 32 and will generally consist of output spikes 34, 36 and 38 corresponding to the placement of noise indicia located upon the sound track 10. The noise spikes 34, 36 and 38, if of the same size on the film, will have the same electrical amplitude as illustrated.

The output of the detector 30 is suitably amplified by means of an amplifier 40 and the output will consist of an electrical signal indicative of the red light emanating from light 18 being modulated by the cyan sound track 10 on the film 12 as shown in wave form 42. The output of amplifier 40 will also include noise modulation components on the wave form 42 corresponding to the noise indicia located on the sound track as noise spikes 44, 46 and 48 corresponding in time relationship to noise spikes 34, 36 and 38 appearing at the output of amplifier 32.

The amplitude variations 44, 46 and 48 appearing on wave form 42 do not have the same amplitude because of the nature of the variable density recording of the sound track 10 on film 12.

A review of the variable density recording techniques will show that a sign wave or other signal generated results from a variation in the intensity of given marks on the full width record medium. The variations in intensity of the marks determines the recorded information contained on the sound track. For example, the positive-going half of wave form 42 is formed during a light or low density portion, whereas the lower half of wave form 42 is formed during a more dense portion where the light obstruction is greater. It will be appreciated therefore that noise indicia appearing on the upper half of the signal when the bar intensity is light will have a greater effect on the signal than noise indicia at 48 which appear when the bars are dark.

It is recognized that noise will appear at arbitrary locations and it is not possible to select undesired indicia at the dark portion of the signal when the effect of the noise will be less than should the same indicia appear during the less dense portion of the signal when the effect of the noise indicia will be greatest. The arbitrary selection of noise signals at 44, 46 and 48 are illustrated to show the varying effect of the same noise indicia on a given desired signal.

A comparison of the noise signal channel at the output of amplifier 32 will show that the noise spikes 34, 36 and 38 are all of equal amplitude because the infrared signal passing through the film is not affected by the modulation of the cyan sound track but only by the noise indicia itself.

In the preferred embodiment a portion of the output signal from amplifier 40 is fed to an envelope generator which has the effect of modulating the output of detector 32 so as to modulate the amplitude of spikes 34, 36 and 38 to spikes 34 prime, 36 prime and 38 prime in the same proportion as determined by the envelope signal 42. In this fashion the detected noise spikes 34 prime, 36 prime and 38 prime bear the same amplitude relationship as noise 44, 46 and 48 bear to the desired signal 42.

The phase relationship between the desired signal 42 and the modified noise channels spikes 34 prime, 36 prime and 38 prime has not been altered and it is only necessary to algebraically combine the two signals in the proper sense so as to cause 34 prime to subtract 44, 36 prime to subtract 46, and 38 prime to subtract 48 to thereby allow the desired signal 42 free of noise signals to pass through. In one embodiment the output of the envelope detector 50 is fed to a phase inverter 52 which in turn combines the noise output channel with the desired channel in amplifier 54.

It is also possible to eliminate the phase inverter channel 52 and feed the output of envelope generator 50 into a suitable differential amplifer 54 which algebraically combines the noise signal with the desired signal so as to produce a desired output free of noise components. The save form 60 illustrates the output from phase inverter 52. In the event the envelope generator 50 and the phase inverter 52 are not used, then the output from amplifier 32 will be fed directly into amplifier 54 where both input signals are algebraically combines to produce the desired output signal.

The invention as described in connection with FIG. 1 utilizes state-of-the-art techniques at all points to generate a noise signal which is combined out of phase with the desired signal so as to eliminate noise components.

The inventive concept has been built and tested without the envelope generator 50 and in which the output from amplifier 32 is combined with the output of detector 40 in an out of phase relationship and tests have verified an immediate 15 db gain in the signal to noise ratio. The addition of the envelope detector 50 should tend to improve the signal to noise ratio by more properly balancing the amplitude of the noise in the noise channel with the reduced amplitude of the noise in the desired signal where the noise amplitude is produced in the dense portion of the variable density recording and hence has a lesser effect on the output signal.

The invention has been described in connection with a variable density recording since that is believed to represent the best mode of operation; however, the invention is also applicable to variable area recording. In any event, it is required that the sound track be recorded in color and while the invention has been described primarily with the cyan recorded sound track, it is understood that any color may be used consistent with light sources available and detectors that are compatible with these light sources.

The invention is compatible with multi track recording such as for stereo and quad which is now becoming more popular. Other techniques of recording multiple sound tracks in different colors may also be used with the infrared noise canceling techniques described herein.

I claim:

1. A system for reducing the effect of undesired information in the form of noise on the sound track of motion picture film having desired recorded information printed on the film in a given color sound track comprising:
    means for generating light signals including infrared signals adapted to be modulated by undesired information on the movie film sound track,
    said light signals including color responsive signals adapted to be modulated by said undesired signals on said sound track,
    means for focusing said light signals on said sound track of said movie film,
    means for separating said modulated infrared light signals from said color modulated light signals and directing each of said light signals to a first light detecting means and to a second light detecting means respectively,
    said first detector means generating a noise signal indicative of undesired information on said movie film sound track,
    said second detector means generating a noise plus desired signal indicative of said modulated desired sound track information and said undesired information,
    means for algebraically combining said noise signal with said noise plus desired signal for canceling the effects of said noise signal whereby the output signal is substantially all desired signal, and
    the noise signal output from said first detector is amplitude corrected by the output of said second detector for changing the amplitude of the noise output signal as a function of the variations in apparent density of said sound track.

2. A system according to claim 1 in which said sound track is printed in cyan and said light means generates light in both the red and infrared bands.

3. A system according to claim 1 in which said separating means is a dichroic filter for passing said undesired modulated infrared noise signal to said first detector and reflecting said desired modulated signal plus noise signal to said second detector.

4. A system according to claim 1 in which the sound track on said movie film is recorded as a variation in density and said variations are printed in color and said output signal from said second detector is modulated as a function of the variations in density of the sound track.

5. A system according to claim 1 which includes an envelope generator controlled by the output of said second detector means for modulating the amplitude output of said first detector means.

* * * * *